(12) United States Patent
Lesonen

(10) Patent No.: US 9,417,742 B2
(45) Date of Patent: Aug. 16, 2016

(54) TOUCH SENSITIVE DISPLAY

(71) Applicant: Nokia Corporation, Espoo (FI)

(72) Inventor: Janne Edvin Lesonen, Helsinki (FI)

(73) Assignee: Nokia Technologies Oy, Espoo (FI)

( * ) Notice: Subject to any disclaimer, the term of this patent is extended or adjusted under 35 U.S.C. 154(b) by 193 days.

(21) Appl. No.: 13/891,271

(22) Filed: May 10, 2013

(65) Prior Publication Data

US 2014/0333845 A1 Nov. 13, 2014

(51) Int. Cl.
*G06F 3/00* (2006.01)
*G06F 3/044* (2006.01)

(52) U.S. Cl.
CPC ........... *G06F 3/044* (2013.01); *Y10T 29/49155* (2015.01)

(58) Field of Classification Search
CPC ..... G06F 1/1692; G06F 1/1643; G06F 3/044; G06F 3/041; G06F 3/0488; H03K 17/975
See application file for complete search history.

(56) References Cited

U.S. PATENT DOCUMENTS

2010/0214247 A1* 8/2010 Tang et al. ..................... 345/173
2013/0207911 A1* 8/2013 Barton et al. ................. 345/173
2014/0226083 A1* 8/2014 Dunphy et al. ................. 349/12

* cited by examiner

*Primary Examiner* — Michael Faragalla
(74) *Attorney, Agent, or Firm* — Harrington & Smith

(57) ABSTRACT

An apparatus including: an array of capacitive sensor electrodes including a plurality of distinct capacitive sensor electrodes distributed in two orthogonal directions over a sensing area; and a plurality of conductive traces each of which is operatively connected to one of the first plurality of distinct capacitive sensor electrodes, wherein at least some of the conductive traces are routed over the sensing area and are opaque metal traces.

20 Claims, 4 Drawing Sheets

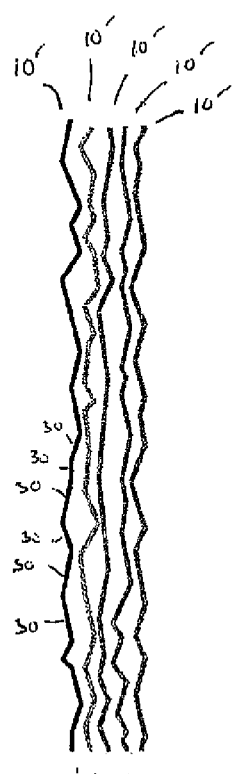
Fig 5
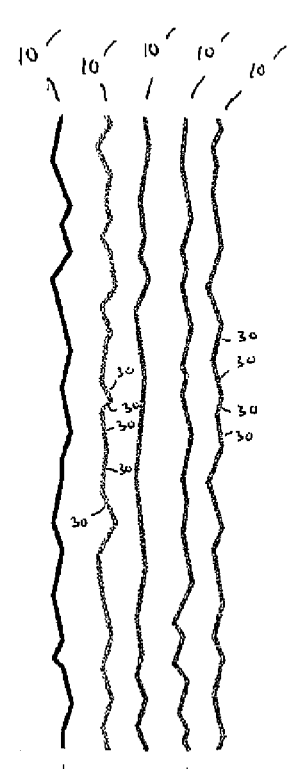
Fig 6
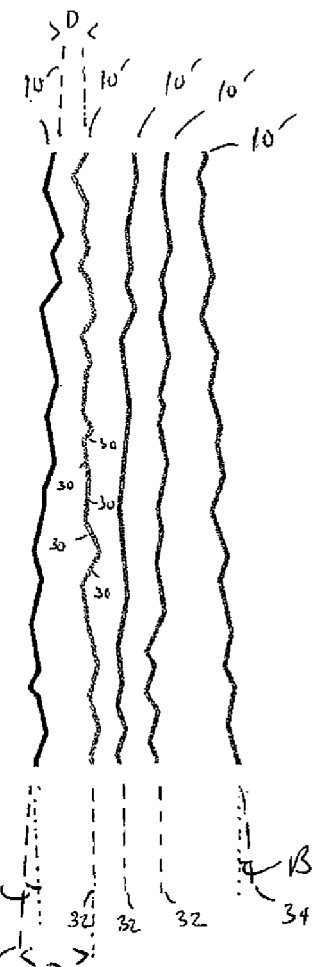
Fig 7
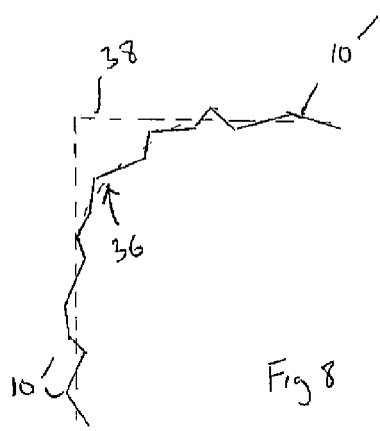
Fig 8
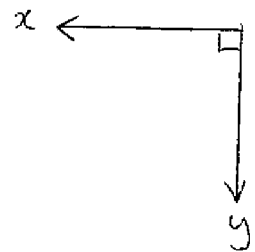

TOUCH SENSITIVE DISPLAY

TECHNOLOGICAL FIELD

Embodiments of the present invention relate to an apparatus. In particular, they relate to an apparatus comprising a plurality of capacitive sensor electrodes distributed over a sensing area.

BACKGROUND

Current touch sensitive displays may use a plurality of capacitive sensor electrodes distributed over a sensing area. The capacitive sensor electrodes sense a proximal object such as a user's finger, stylus or any conductive object touching the sensing area.

BRIEF SUMMARY

According to various, but not necessarily all, embodiments of the invention there is provided an apparatus comprising: an array of capacitive sensor electrodes comprising a plurality of distinct capacitive sensor electrodes distributed in two orthogonal directions over a sensing area; and a plurality of conductive traces each of which is operatively connected to one of the first plurality of distinct capacitive sensor electrodes, wherein at least some of the conductive traces are routed over the sensing area and are opaque metal traces.

According to various, but not necessarily all, embodiments of the invention there is provided a method comprising: providing sensor electrodes for touch sensing over a sensing area, distributed in two orthogonal directions over a sensing area; and routing conductive traces to each of the capacitive sensor electrodes wherein at least some of the conductive traces, where they are routed over the sensing area, are opaque metal traces.

According to various, but not necessarily all, embodiments of the invention there is provided apparatus and methods as defined in the appended claims.

BRIEF DESCRIPTION

For a better understanding of various examples of embodiments of the present invention reference will now be made by way of example only to the accompanying drawings in which.

Figure 3:
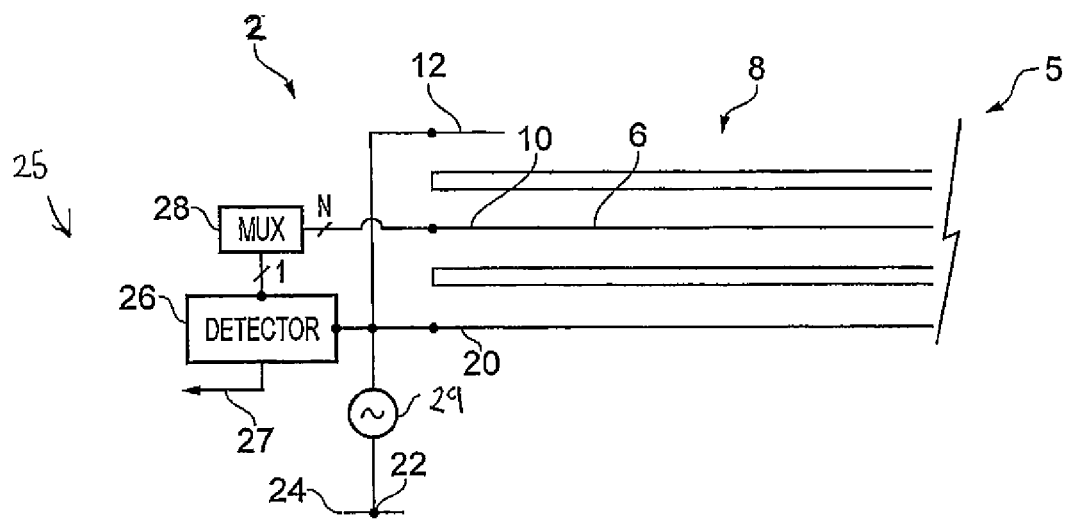
Figure 4:
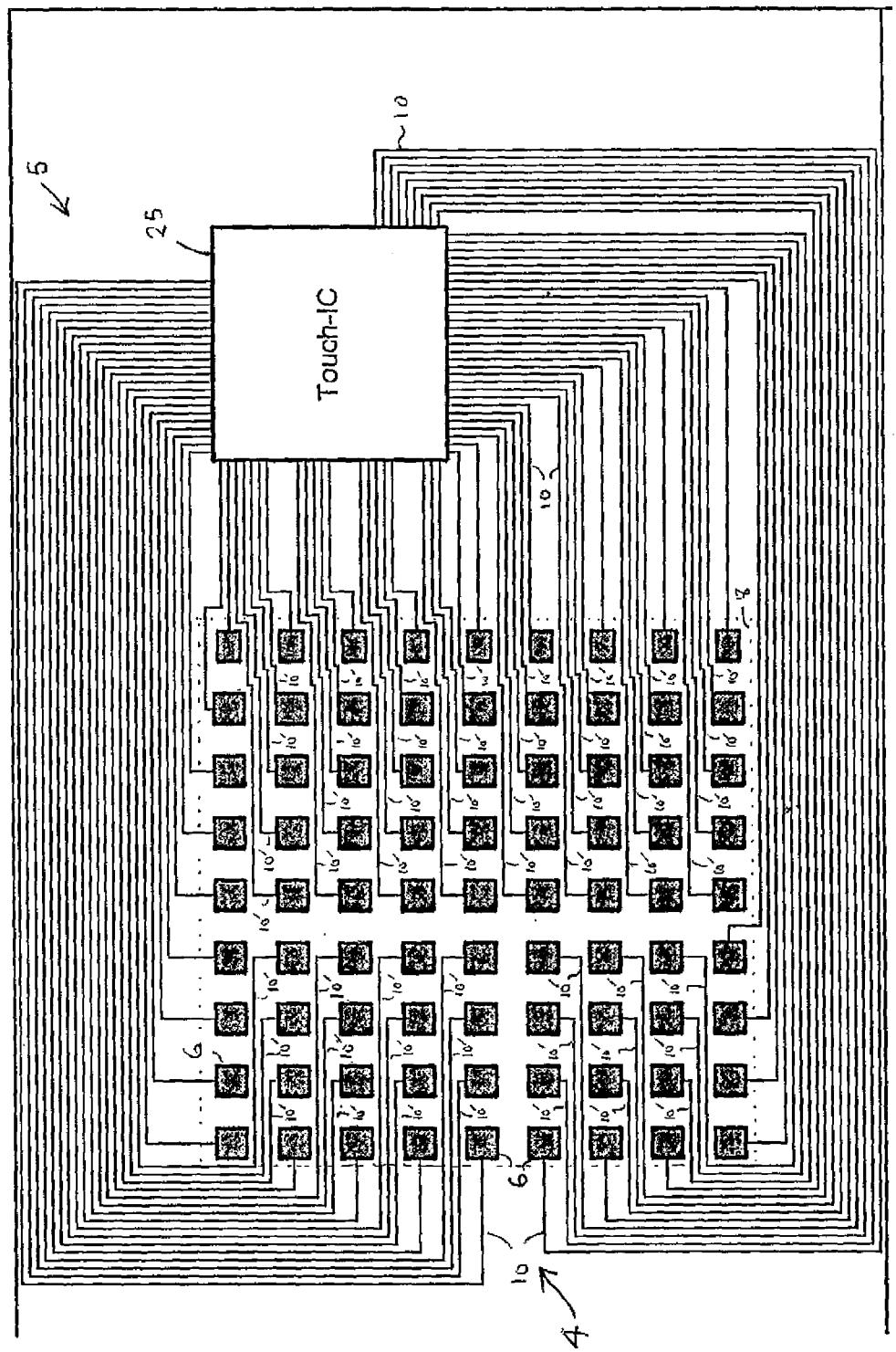
Figure 9A:
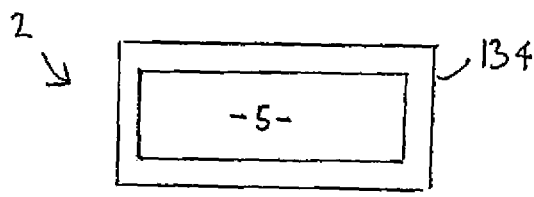
Figure 9B:
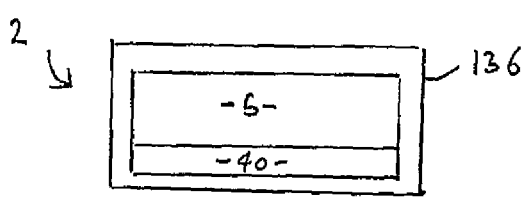

FIG. 3 schematically illustrates an example of a cross-section through a sensing arrangement;

FIG. 4 illustrates a plan view of an example of a sensing arrangement comprising distributed discrete capacitive sensing electrodes;

FIG. 5 illustrates an example in which adjacent opaque metal portions of the conductive traces are irregular and the overall alignment of the portions is the same and the average spacing between the portions is the same;

FIG. 6 illustrates an example in which adjacent opaque metal portions of the conductive traces are irregular and the overall alignment of the portions is the same but the average spacing between portions varies;

FIG. 7 illustrates an example in which adjacent opaque metal portions of the conductive traces are irregular and the overall alignment of the portions varies because some of the portions run at an angle compared to the others;

FIG. 8 illustrates an example where a portion of the conductive trace needs to be routed so that it changes direction;

FIG. 9A illustrates an example of a touch panel module;

FIG. 9B illustrates an example of a touch sensitive display module; and

Figure 9C:
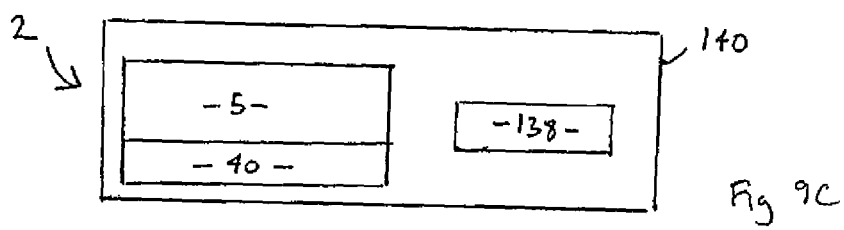

FIG. 9C illustrates an example of an electronic device.

Figure 10:
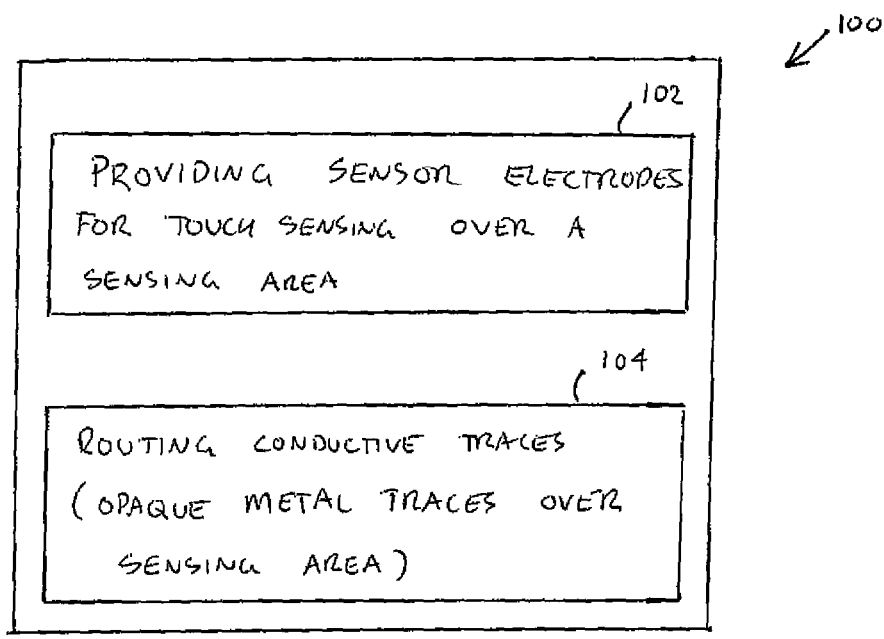

FIG. 10 illustrates an example of a method.

DETAILED DESCRIPTION

The Figures illustrate an apparatus 2 comprising: an array 4 of capacitive sensor electrodes 6 comprising a plurality of distinct capacitive sensor electrodes 6 distributed in two orthogonal directions (x, y) over a sensing area 8; and a plurality of conductive traces 10 each of which is operatively connected to one of the first plurality of distinct capacitive sensor electrodes 6, wherein at least some of the conductive traces 10 are routed over the sensing area 8 and are opaque metal traces 10'.

Figure 1:
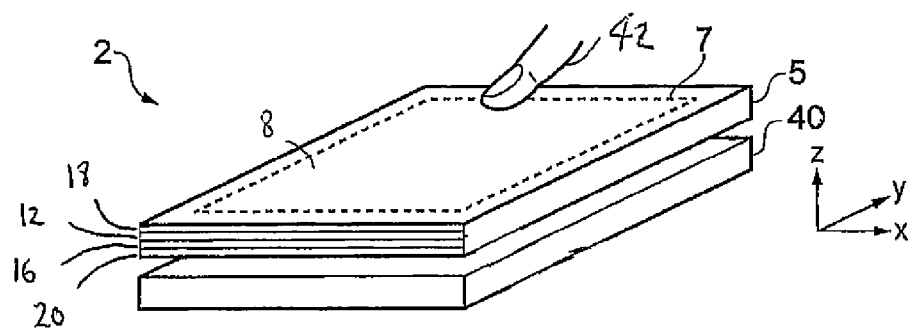
FIG. 1 illustrates an example of an apparatus comprising a sensing arrangement comprising a plurality of capacitive sensor electrodes distributed over a sensing area.

FIG. 1 illustrates an apparatus 2 comprising: a sensing arrangement 5 comprising, in a layer 16, a plurality of capacitive sensor electrodes 6 distributed over a sensing area 8 and conductive traces 10 at least partially distributed over the sensing area 8.

In this example, the apparatus 2 overlies a display 40 and operates as a capacitive touch panel for the display 40. The display 40 and the apparatus 2 in combination form a touch sensitive display configured to detect a variation in capacitance arising from proximity of a user input device 42 to one or more of the plurality of capacitive sensor electrodes 6.

The sensing arrangement 5 is configured to sense a variation in capacitance arising from proximity of a user input device 42 at or over the sensing area 8 of a touch surface 7. In this example the user input device 42 is a user's finger.

The apparatus 2 is configured to sense the (x, y) position of the user's finger within the sensing area 8 when it touches the sensing area 8 of the touch surface 7. In some examples, the apparatus 2 may additionally provide a (z) position of the user's finger when it is close to but not touching the sensing area 8 of the touch surface 7 and/or provide an (x, y) position of the user's finger when it is close to but not yet touching the sensing area 8 of the touch surface 7. The apparatus 2 may therefore provide for not only two-dimensional sensing but also three-dimensional sensing.

The apparatus 2 may optionally comprise a first shield electrode 12 overlying conductive traces 10 at least outside the sensing area 8; and a second shield electrode 20 underlying, in the sensing area 8, the conductive traces 10 and the capacitive sensor electrodes 6. The second shield electrode 20 may be a continuous uninterrupted single layer electrode that underlies the layer 16.

The apparatus 2 may optionally comprise a circular polarizer 18 overlying the array 4 of capacitive sensor electrodes 6 and the plurality of conductive traces 10.

Figure 2:
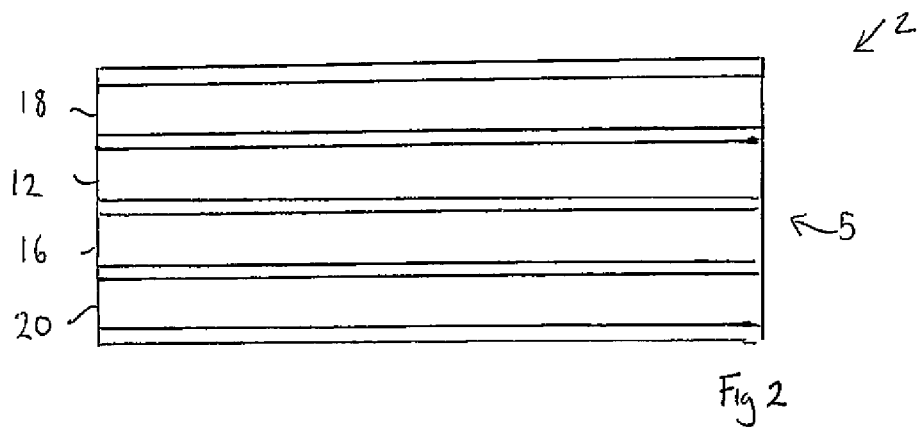
FIG. 2 illustrates an example of a sensing arrangement comprising a plurality of capacitive sensor electrodes distributed over a sensing area.

FIG. 2 illustrates an apparatus 2 that has a sensing arrangement 5 comprising, in a layer 16, a plurality of capacitive sensor electrodes 6 distributed over a sensing area 8 and conductive traces 10 at least partially distributed over the sensing area 8. The apparatus 2 also comprises a first shield electrode 12 overlying conductive traces 10 outside the sensing area 8, a second shield electrode 20 underlying, in the sensing area 8, the conductive traces 10 and the capacitive sensor electrodes 6 and a circular polarizer 18 overlying the capacitive sensor electrodes 6 and the plurality of conductive traces 10.

FIG. 4 illustrates a plan view of an example of a sensing arrangement 5. The Figure illustrates the distribution of the capacitive sensing electrodes 6 over the sensing area 8 and their associated plurality of conductive traces 10. Each conductive trace 10 routes signals between a capacitive sensing electrodes 6 and the integrated control circuitry 25.

The capacitive sensor electrodes 6 are usually distributed in two orthogonal directions over the sensing area 8 as an array 4. The array 4 of capacitive sensor electrodes 6 is configured to sense the (x, y) position of the user's finger within the sensing area 8 when it touches the first sensing area 8 of the touch surface 7. In some examples, the array 4 of capacitive sensor electrodes 6 may additionally provide a (z) position of the user's finger when it is close to but not touching the sensing area 8 of the touch surface 7 and/or provide an (x, y) position of the user's finger when it is close to but not yet touching the first sensing area 8 of the touch surface 7.

Conductive traces 10 are operatively connected to the plurality of distinct capacitive sensor electrodes 6.

Each of the conductive traces 10 is operatively connected to one of the capacitive sensor electrodes 10.

Portions 10' of the conductive traces 10 where they are routed over the sensing area 8 are opaque highly conductive traces. In this example they are metal traces 10'.

The opaque metal traces 10' are configured to reduce their visibility to the human eye, for example, as illustrated in FIGS. 5, 6 and 7.

In FIGS. 5, 6 and 7 adjacent opaque metal portions 10' of the conductive traces are irregular.

For example, adjacent portions 10' of conductive traces cannot be linearly translated relative to each other such that they are substantially aligned.

The illustrated portions 10' of the conductive traces extend in a first direction 32 up/down the page or substantially in the first direction 32. The portions 10' are comprised of a sequence of parts 30 at least some of which parts are not aligned with the first direction 32.

Each portion 10' comprises a sequence of interconnected parts 30. For each portion 10', the length and/or orientation of the parts 30 varies along its length (in the first direction).

In the examples illustrated, each portion 10' has a sequence of parts 30 that are rectilinear in shape, are variable in length and are variable in orientation.

Each portion 10' has a different sequence of different parts 30. Although each part 30 is rectilinear in shape, there is no correlation between the length and orientation of a part and the length and orientation of an adjacent part of an adjacent portion 10'.

The sequence of parts 30 of a portion 10' may be generated as a directed random walk, where the parts 30 correspond to steps in the walk. The random walk may be directed in a preferred first direction 32 such as up/down the page in FIGS. 5 and 6 (and in FIG. 7 but only for some of the portions 10') or in a direction 34 slightly off-set from the first direction 32 such an the outside portions 10' in FIG. 7. The random walk may be constrained, for example, each step (part 30) may have a length randomly selected from range between a minimum length and a maximum length and the orientation of the step (part 30) from the direction 32, 34 of the random walk may be selected randomly from a range between a counter-clockwise offset angle (−θ) and a clockwise offset angle (θ). The range of lengths and off-set angles may be fixed or may be interdependent. For example, it may be possible to have larger off-set angles for shorter lengths and/or longer lengths for smaller off-set angles.

In FIG. 5, the average (arithmetic mean) lateral separation D between the adjacent ones of the portions 10' is fixed along the lengths of those portions and is constant between pairs of adjacent portions 10'. That is the direction of the random walks in the same and equally separated.

In FIG. 6, the average (arithmetic mean) lateral separation D between the adjacent ones of the portions 10' is fixed along the lengths of those portions 10' and is variable between pairs of adjacent portions 10'. That is the direction of the random walks in the same but not equally separated.

In FIG. 7, for the central three portions 10', the average (arithmetic mean) lateral separation between the adjacent portions 10' is fixed along the lengths of the portions and is constant between pairs of, adjacent portions 10'. That is the direction of the random walks in the same and equally separated. For the outside portions 10', the average (arithmetic mean) lateral separation D between the adjacent portions 10' is variable along the lengths of the portions 10. That is the direction of the random walks is different.

The central three portions 10' are directed in the same first direction 32 or very slightly off-set from it. The leftmost outside portions 10' is directed in a direction 34 at an angle α to the first direction 32 such that the average (arithmetic mean) lateral separation D between it and the adjacent portion 10' decreases as one moves along its length (up the page). The rightmost outside portions 10' is directed at an angle β to the first direction 32 such that the average (arithmetic mean) lateral separation between it and the adjacent portion 10' decreases as one moves along its length (up the page).

FIG. 8 illustrates an example where a portion 10' of the conductive trace needs to be routed so that it changes its direction from an initial direction (e.g. x) to another direction (e.g. y) substantially orthogonal to the initial direction. The Figure illustrates that the portion 10' of the conductive trace, where it changes direction, comprise a bend (curve) 36 as opposed to a corner 38. That is the average (arithmetic mean) change in position of a portion 10' over a range of a short length (e.g. one or two parts 30) of the portion 10' has a rate of change that is less that a threshold value and may be between a range of values.

Referring back to FIGS. 1 and 2, the first shield electrode 12 may be used to cover the conductive traces 10 where they group, outside the sensing area 8, at the edges. The first shield electrode 12 may be used to cover areas that lie outside the sensing area 8. In some but not necessarily all embodiments, the first shield electrode 12 may also cover some parts of the touch sensing area 8.

The capacitive sensor electrodes 6 and the second shield electrode 20 overlie, in this example, a display 40. As they overlie a display 40 they are preferably transparent. The portions 10' of the conductive traces 10, where they overlie the display 40 are configured to reduce their visibility as, for example, described above.

The first shield electrode 12 and the capacitive sensor electrodes 6 and the second shield electrode 20 may be formed from conductive and transparent material. They may be formed from the same or similar material or mixtures of material. Examples of suitable conductive and transparent materials include, for example, Indium-Tin-Oxide (ITO), metal mesh, silver nanowires and carbon nanotube composite.

In the above examples, the array 4 of capacitive sensor electrodes 6 is arranged as a regular array that is an N row by M column regular array, with common fixed spacing between columns and common fixed spacing between rows. However, it should be appreciated that the arrays 4 of capacitive sensor electrodes 6 need not be regular arrays and may be any suitable distribution of capacitive sensor electrodes 6. In the above examples, the array 4 of capacitive sensor electrodes 6 is arranged as NM distinct capacitive sensors 6 each of which is at an unique position (x,y) and each of which is operatively connected to a conductive trace 10. There is, in this example, common fixed spacing between the distinct, non-overlapping capacitive sensor electrodes 6 in the column direction and the row direction. In addition, in this example, the array 4 of capacitive sensor electrodes 6 occupy a single layer 16.

FIG. 3 schematically illustrates a cross-section through the sensing arrangement 5 along a line corresponding to a capacitive sensor electrode 6.

In this example, control circuitry 25 comprises a node 22, reference voltage circuitry 24, detection circuitry 26, multiplexer 28, and drive circuitry 29.

When the apparatus 2 is operational the node 22 is held at a constant potential such as, for example, ground potential. Circuitry 24 is configured to provide a reference voltage signal to the node 22. The circuitry 24 could be a simple galvanic connection to ground provided by, for example, a housing, a ground plane or a chassis.

The first shield electrode 12 is operatively connected to a node 22. Operatively connected means that there is a signal path but they may or may not be directly physically connected.

In this example, a second shield electrode 20 is present. It is also operatively connected to the node 22.

Detection circuitry 26 is operatively connected between the first shield electrode 12 and the array 4 of capacitive sensor electrodes 6.

A multiplexer 28 is operatively connected between the detection circuitry 26 and the array 4 of capacitive sensor electrodes 6. The multiplexer 28 is configured to isolate, for detection, each of the plurality of capacitive sensor electrodes 6 of the array 4.

Drive circuitry 29 is configured to provide an alternating voltage to the first shield electrode 12 and, if present, the second shield electrode 20.

The drive circuitry 29 is configured to provide simultaneously a time varying electric field at each of the capacitive sensor electrodes 6.

The detection circuitry 26 is configured to detect a variation in capacitance arising from proximity of a user input device 42 to one or more of the plurality of capacitive sensor electrodes 6. The detection circuitry 26 may comprise a low-impedance charge amplifier.

When the user's hand, or some other user input device 42, is brought to the vicinity of the sensing area 8 of the apparatus 2, a capacitive current flows from the first shield electrode 12 through the detection circuitry 26 to one or more capacitive sensor electrodes 6. The charge amplifier in the detection circuitry 26 registers a charge displacement due to the current. The output of the charge amplifier is synchronously rectified and integrated, after which it is passed to an analog-to-digital converter and then provided as digital output 27 for processing in the digital domain.

The drive voltage and the drive frequency typically range from 1 V to 10 V and from 10 to 200 kHz, respectively.

Due to reasons of cost and size, a single charge amplifier and a single analog-to-digital converter may be used in the detection circuitry 26 for multiple capacitive sensor electrodes 6 and a multiplexer 28 may be used to isolate for sensing each capacitive sensor electrode 6 separately.

FIG. 9A illustrates the apparatus 2 embodied as a touch panel module 134 that comprises the sensing arrangement 5. The apparatus 2 is operable as a functional sensing arrangement 5 and, with additional components, as a functional display. The touch panel module 134 may be used in combination with a display 40 to form a touch screen display.

FIG. 9B illustrates the apparatus 2 embodied as a touch panel module 136 that comprises the sensing arrangement 5 and a display 40. The apparatus 2 is operable as a functional sensing arrangement 5 and as a functional display.

FIG. 9C illustrates the apparatus 2 embodied as an electronic device 140 that at least comprises the sensing arrangement 5 and a display 40. The apparatus 2 is operable as a functional display 40 and a functional sensing arrangement 5. The electronic device 38 may, for example, additionally comprise a processor 138 that processes the output 27 of the detection circuitry 26.

FIG. 10 illustrates a method 100 comprising:

at block 102, providing sensor electrodes 6 for touch sensing over a sensing area 8, distributed in two orthogonal directions (x, y) over the sensing area 8; and at block 104, routing conductive traces 10 to each of the capacitive sensor electrodes 6 wherein at least some of the conductive traces 10, where they are routed over the sensing area 8, are opaque metal traces 10'.

The method 100 may also comprise providing a circular polarizer 18 over the capacitive sensor electrodes 6 and at least the opaque metal traces 10'.

As previously described, the opaque metal traces 10' may be configured to have a reduced visibility to the human eye. For example, the adjacent opaque metal traces 10' may be irregular.

At least some of the opaque metal traces 10' may comprise portions that extend in a first direction 32, wherein the portions are comprised of a sequence of parts 30 at least some of which parts 30 are not aligned with the first direction 32 (see FIGS. 5-7, for examples).

A first one of the opaque metal traces 10' comprises a first portion and a second one of the conductive traces 10' comprises a second portion adjacent the first portion, wherein the first portion comprises a first sequence of first parts 30 and the second portion comprises a second sequence of second parts 30. The first one of the opaque metal traces 10' and the second one of the opaque metal traces 10' extend in a same first direction (see FIGS. 5 & 6 for example) or in substantially a same first direction (see FIG. 7, for example).

The opaque metal traces 10', where they change direction, may comprise bends 36 as opposed to corners 38 (see FIG. 8, for example).

As used here 'module' refers to a unit or apparatus that excludes certain parts/components that would be added by an end manufacturer or a user.

In the above described examples the conductive traces 10 are described as having opaque highly conductive (e.g. metal) portions 10' where they are routed over the sensing area 8. A significant proportion or all of the conductive traces 10 routing may occur through the sensing area 8 using the portions 10' thereby reducing the need for significant routing of conductive traces 10 outside the sensing area 8, for example, along its sides. The first shield electrode 12 may be optional in such circumstances.

In the above described examples the conductive traces 10 are described as having opaque highly conductive (e.g. metal) portions 10' where they are routed over the sensing area 8. In some embodiments, the portions 10' may only be part of the conductive traces 10, for example, the opaque metal portions 10' may only exist where they are routed over the sensing area 8. In other embodiments, the portions 10' may be a greater part or the whole of the conductive traces 10 and may, for example, be routed in areas outside the sensing area 8. Where, the opaque highly conductive (e.g. metal) portions 10' are used for routing not only within the sensing area 8 but also outside the sensing area 8, the first shield electrode 12 may not be useful because stray capacitance is reduced because of the smaller area of the opaque highly conductive portions 10'. The first shield electrode 12 may be optional in such circumstances.

In the above described examples opaque metal traces 10' are described, however, other types of opaque conductive traces may be used such as for example non-metallic material that has a sufficiently high conductivity. The conductivity of the opaque traces 10' is typically at least 1 or 2 decades higher than with indium tin oxide (ITO): meaning square (sheet) resistance being in the range of 0.1-10 $\Omega/\square$. The square (sheet) resistance may be less that 5 $\Omega/\square$. The square (sheet) resistance may be less that 1 $\Omega/\square$. The square (sheet) resistance may be less that 0.5 $\Omega/\square$. The width of the opaque traces 10' is typically less than 15 μm and may be less than 5 μm.

In the above described examples, conductive traces 10 and/or their opaque portions 10' may be routed between capacitive sensor electrodes 6. However, in other embodiments, conductive traces 10 and/or their opaque portions 10' may be routed over or under the capacitive sensor electrodes 6. An insulating layer may be used where it is desired to electrically isolate the conductive traces 10 and/or their opaque portions 10' from the over or under lying capacitive sensor electrodes 6.

In the above described examples, conductive traces 10 and/or their opaque portions 10' may be routed in any appropriate way. They do not have to routed from a particular edge or edges nor do they have to follow the shortest path or the closest path on the x/y direction.

In the above described examples, although the capacitive sensor electrodes 6 may be illustrated as quadrilaterals they may be any appropriate shape or shapes, nor do they need to be of equal size.

In the above described examples, although the capacitive sensor electrodes 6 may be illustrated as having the same or similar gaps between adjacent capacitive sensor electrodes 6, in other embodiments the gap between different capacitive sensor electrodes 6 may vary.

In the above described examples, although the capacitive sensor electrodes 6 may be illustrated as being placed in a regular array, in other embodiments the capacitive sensor electrodes 6 may be at different positions.

In this document reference to an area refers to a two-dimensional space defined by a plane of the x and y components of a touch input position. Reference to an area overlapping another area refers to an intersection of volumes produced by projecting the areas normal to that plane. If areas are overlapping the projected volumes intersect and if the areas do not overlap the projected volumes do not intersect. Reference to an area overlapping another area does not necessarily imply an ordering to layers or components, which may be described explicitly.

Operatively connected means connected in a manner that enables the required functionality (operation). Any number or combination of intervening elements can exist (including no intervening elements) between two items that are operatively connected.

Although embodiments of the present invention have been described in the preceding paragraphs with reference to various examples, it should be appreciated that modifications to the examples given can be made without departing from the scope of the invention as claimed.

Features described in the preceding description may be used in combinations other than the combinations explicitly described.

Although functions have been described with reference to certain features, those functions may be performable by other features whether described or not.

Although features have been described with reference to certain embodiments, those features may also be present in other embodiments whether described or not.

Whilst endeavoring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

I claim:

1. An apparatus comprising:
   an array of capacitive sensor electrodes comprising a plurality of distinct capacitive sensor electrodes distributed over a sensing area of a touch sensitive display; and
   a plurality of conductive traces wherein each respective conductive trace is thinner than and operatively connected to one wider corresponding distinct capacitive electrode of the first plurality of distinct capacitive sensor electrodes to form a respective conductive trace and distinct capacitive sensor electrode pair, wherein the pair comprises the one wider capacitive sensor electrode having a sheet resistance at least ten times greater than the respective thinner conductive trace, wherein at least some of the conductive traces are routed over the sensing area and are opaque traces, and wherein portions of the adjacent opaque, conductive traces routed over the sensing area are irregular with respects to each other to present an irregular pattern and reduced perceived visibility to the human.

2. An apparatus as claimed in claim 1, wherein the conductive traces have an electrical resistance less than 10 $\Omega/\square$ and are configured in layout to reduce their visibility to the human eye.

3. An apparatus as claimed in claim 1, wherein at least some of the conductive traces comprise portions that extend in a first direction, wherein the portions are comprised of a sequence of parts at least some of which parts are not aligned with the first direction.

4. An apparatus as claimed in claim 3, wherein the parts in a sequence of parts have irregular lengths of metal.

5. An apparatus as claimed in claim 3, wherein the parts in a sequence of parts are rectilinear.

6. An apparatus as claimed in claim 3, wherein the parts in a sequence of parts have irregular orientations.

7. An apparatus as claimed in claim 1, wherein a first conductive trace comprises a first portion and a second conductive trace comprises a second portion adjacent the first portion, wherein the first portion comprises a first sequence of first parts and the second portion comprises a second sequence of second parts.

8. An apparatus as claimed in claim 7, wherein the first potion extends in a first direction and a length and/or orientation of the first parts vary along the first direction and wherein the second potion extends in the first direction and a length and/or orientation of the second parts vary differently to the first parts along the first direction.

9. An apparatus as claimed in claim 7, wherein the first portion and the second portion do not correspond after relative linear translation between the first portion and the second portion.

10. An apparatus as claimed in claim 7, wherein the first portion extends as a directed random walk comprised of the first parts and wherein the second conductive trace extends as a directed random walk comprised of the second parts.

11. An apparatus as claimed in claim 7, wherein the first conductive trace and the second conductive trace extend in a same first direction or in substantially a same first direction.

12. An apparatus as claimed in claim 1, wherein the conductive traces, where they change direction, comprise bends as opposed to corners.

13. An apparatus as claimed in claim 1, comprising a circular polarizer overlying the array of capacitive sensor electrodes and the plurality of conductive traces.

14. A method comprising:
    providing sensor electrodes for touch sensing over a sensing area, distributed in two orthogonal directions over a sensing area of a touch sensitive display; and
    routing conductive traces to each of the capacitive sensor electrodes, wherein each respective conductive trace is thinner than and operatively connected to one wider corresponding distinct capacitive electrode to form a respective conductive trace and distinct capacitive sensor electrode pair, wherein the pair comprises the one wider capacitive sensor electrode having a sheet resistance at least ten times greater than the respective thinner conductive trace, wherein at least some of the conductive traces, where they are routed over the sensing area, are opaque traces, and wherein portions of the adjacent opaque, conductive traces routed over the sensing area are irregular with respects to each other to present an irregular pattern and reduced perceived visibility to the human eye.

15. A method as claimed in claim 14, wherein the opaque traces have an electrical resistance less than 10 Ω/□ and are configured to have a reduced visibility to the human eye.

16. A method as claimed in claim 14, wherein at least some of the opaque traces comprise portions that extend in a first direction, wherein the portions are comprised of a sequence of parts at least some of which parts are not aligned with the first direction.

17. A method as claimed in claim 14, wherein the opaque traces, where they change direction, comprise bends as opposed to corners.

18. A method as claimed in claim 14, comprising providing a circular polarizer over the capacitive sensor electrodes and at least the opaque traces.

19. An apparatus as claimed in claim 1, wherein the conductive traces have a width less than 15 μm.

20. An apparatus as claimed in claim 14, wherein the conductive traces have a width less than 15 μm.

* * * * *